May 3, 1938.  J. KOLBE  2,116,027

MOTOR VEHICLE

Filed Aug. 27, 1935  2 Sheets-Sheet 1

Inventor.
Joachim Kolbe
by Bryant & Lowry
Attys.

Patented May 3, 1938

2,116,027

UNITED STATES PATENT OFFICE 2,116,027

MOTOR VEHICLE

Joachim Kolbe, Hanover, Germany

Application August 27, 1935, Serial No. 38,095
In Germany August 28, 1934

5 Claims. (Cl. 280—124)

This invention relates to motor vehicles, in which the carriage body is connected in such a manner by inclined links with the under frame, which may also consist of separate axles, that the body of the vehicle takes up an inclined position on the occurrence of lateral forces, such as are produced by centrifugal force when travelling on curves so that the passengers in the vehicle do not notice these forces or suffer from their effects. It has already been sought to control the inclined position of the body by additional connecting links so that the center of gravity of the body moves upward and sideways, to return again into the normal position on the cessation of the lateral forces without special restoring forces having to be applied, for example by springs. The object of this invention is to improve these known devices in three possible ways.

A first object of the invention is to provide instead of the additional connecting links a slide and roller guide arranged to bring the body always into the desired position.

A second object is to not suspend the body from below but to suspend it from above by composite connecting links combined with guidance by grooves and rollers.

According to a third object the roller bearings are not on the connecting links but on the body itself, so that the connecting links are only used to ensure the transverse position of the axle with respect to the body.

In the first form of the invention each bearer, which is connected on the one hand to the body, and on the other hand to the connecting links, is so positively guided by means of a slot provided on the axle of the vehicle that when the body takes up an inwardly inclined position, the centre of gravity and the body joints are moved on arcs of circles, the centre of which is located, above the joints, on a vertical axis of the vehicle. It is precisely by the movement on arcs of circles, which movement was not possible with the hitherto known constructions, that the most satisfactory result is attained, since only then is the resistance constant which the body offers against raising due to the force of gravity.

In a second form of construction according to the invention each connecting link engaging on the body is hinged by the lower end on bearers, the free ends of which are hinged on the axle, and which are themselves so positively carried, for example, in slots provided on the axle, that on the body assuming the inwardly inclined position, the centre of gravity and the body joints move on arcs of circles, the centre point of which is located above the centre of gravity on the vertical axis of the vehicle. In this case also the same advantage is attained as mentioned above, namely that by exact guiding on arcs of circles a perfect movement is attained.

In another form of construction the body is supported on the axle directly by guides, and by jointed links being provided between the body and the axles, which keep the axles always in a position transverse to the direction of travel, whilst the body, under action of lateral forces, takes up an inwardly inclined position and its centre of gravity rises on an arc of a circle. The guides in this case are constructed as circular paths, in which the body moves, rollers being interposed, so that the body moves directly in the circular path. In this way the advantage is attained that the stressing of the connecting links is no longer as great as with the hitherto known constructions, as they have simply to hold the axle, whilst previously they had to transmit the load of the body on to the axles.

In the accompanying drawings examples of constructions according to the invention are shown.

These figures show a construction with the above mentioned first feature.

Figure 4:
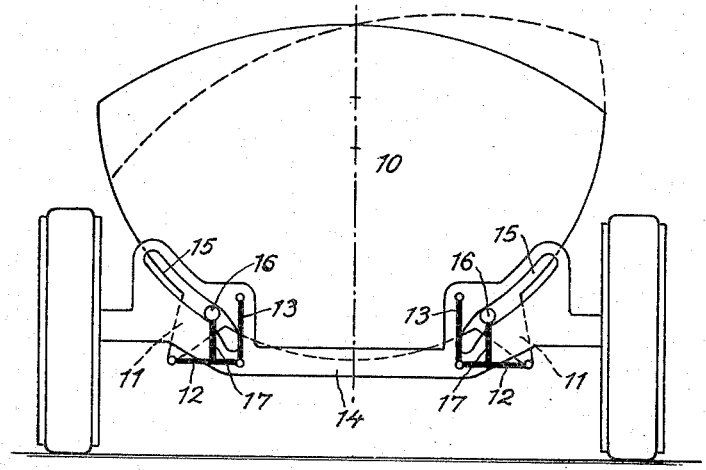

Fig. 4 shows diagrammatically an axle with an alternative construction.

Figure 5:
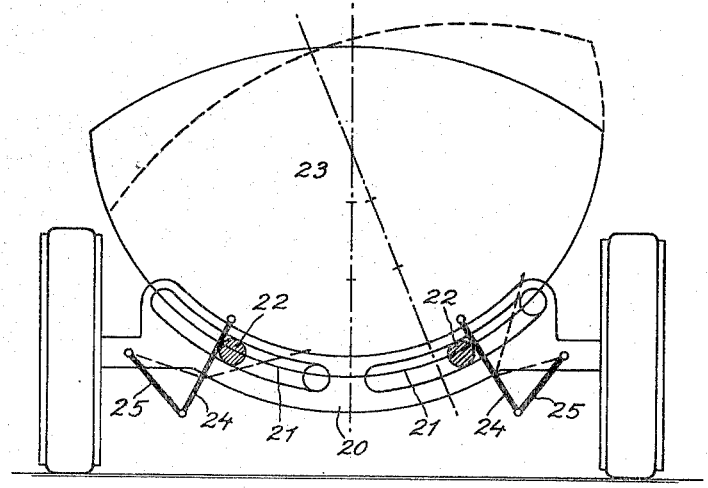

Fig. 5 shows diagrammatically an axle with a third construction.

Figure 1:
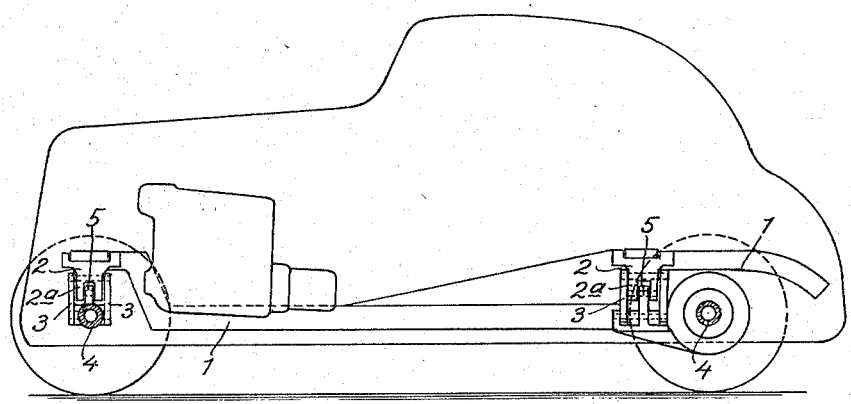
Fig. 1 shows diagrammatically a side view partly in section of a vehicle which is constructed according to the invention.
Figure 2:
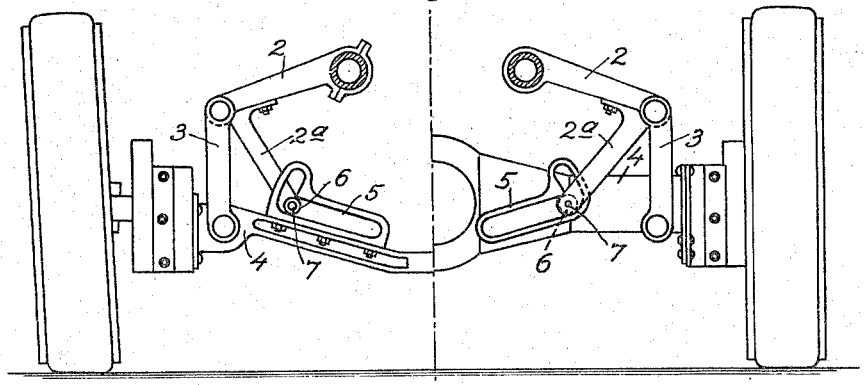
Fig. 2 shows in elevation one half of a front axle (left) and one half of a rear axle (right).
Figure 3:
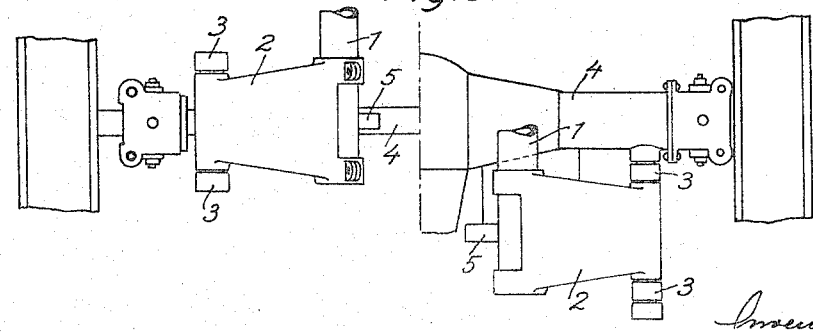
Fig. 3 shows corresponding plan views of the same.

In the construction according to the Figures 1 to 3 the tubular frame 1 supporting the body with the motor, gear box, radiator and other parts, is up-swept at the front and rear end parts with which the links 2 rotatably engage by roller bearings. The free outer ends of the links 2 are hingedly connected by links 3 with the axles 4, and in such a manner that the only possibility of movement is transversely to the direction of travel. The joints may in this case be made as plain or roller bearings. Slotted guide plates 5 extend in the transverse direction and are attached to the axles 4 and have each an angular slot, one limb of which is directed somewhat obliquely upwards, whilst the other limb extends along or parallel to the axle and is directed slightly downward. Rollers 6, which are carried on studs 7 run in these slots, and the studs on their part are firmly connected with the links 2 by means of intermediate members or flanged arms 2a.

Any desired spring system can be provided between the axles and the wheels to take up vertical shocks.

When lateral forces occur, the body controlled by the links 2 and 3 and the guides 5 will always move in such a manner that its centre of gravity and the body link joints describe an exact arc of a circle.

In the construction according to Fig. 4 there are provided on the body 10 downwardly projecting extension pieces 11 on to which connecting links 12 are attached, the free end of which are attached to the axle 14 by means of links 13, and preferably in such a manner that this axle connection is located higher than the connecting joint between the extension 11 and the links 12. On the axle 14 there are also provided, as in the first example, guide slots 15, in which run guide rollers 16, which are either carried directly on the connecting links 12, or are fitted to an arm 17, rigidly connected with the link 12. The guide slots 15 may be curved in approximately circular shape with slightly downwardly directed bends at the inner ends, as shown in the drawings.

In this case, therefore, on the occurrence of lateral forces, the centre of gravity of the body will move exactly on an arc of a circle, and there will thus be the most favorable movement when the centre point of the arc lies above the centre of gravity of the body.

In the construction according to Fig. 5 there are again provided arc-shaped guide-ways 21 on the axle 20 in which run rollers 22, which in this case, however, are directly carried on the body 23. Furthermore, pivotally connected on the body 23 are links 24, the free ends of which are connected to other links 25, which on their part are pivoted on the axle 20. If a vehicle constructed in this manner runs on a curve, the centrifugal force acting transversely exerts a lateral thrust on the body 23 so that, under the influence of the guideways 21, it rolls into an inclined position. The resistance determined by the guide-ways 21 to the taking up of the inclined position that is the form of these guide-ways is such that the body always takes up an exact or approximately exact position in the direction of the resultant of centrifugal force and force of gravity. With reducing centrifugal force the body will then automatically move back into the normal position. The double connecting links 24, 25 in this case always keep the axles in a position transverse to the direction of travel. With all these constructions, the result is also attained that the axles, even without any spring system, and independently of each other, can take up a position inclined by 30 degrees to the body, thus producing a vehicle extraordinarily well adapted to rough travelling.

Having thus described my invention, what I claim is:

1. In a motor vehicle, an underframe including axles having slots therein, a body mounted on the axles and adapted to assume an inclined banking position under the influence of lateral forces when travelling through curves on roads, and a connection between the body and separate axles including composite links pivotally connected at their outer ends to the body and axles respectively, and acting to maintain the axles in proper transverse position and against longitudinal movements relative to the body of the vehicle, the axle connections being held against movements laterally of the vehicle body, and another part of each of the composite links being guided by the slots, the body being guided in its movements by movements of said parts of said links in said slots.

2. In a motor vehicle, an underframe including axles having slots therein, a body mounted on the axles and adapted to assume an inclined banking position under the influence of lateral forces when travelling through curves on roads, and a connection between the body and separate axles including composite links pivotally connected at their outer ends to the body and axles respectively, and acting to maintain the axles in proper transverse position and against longitudinal movements relative to the body of the vehicle, the axle connections being held against movements laterally of the vehicle body, one part of each of said composite links carrying a flanged arm provided with a roller at its free end that is positively guided by the slots, the body being guided in its movements by movements of said parts of said links in said slots.

3. In a motor vehicle, an underframe including axles having slots therein, a body mounted on the axles and adapted to assume an inclined banking position under the influence of lateral forces when travelling through curves on roads, and a connection between the body and separate axles including composite links pivotally connected at their outer ends to the body and axles respectively, and acting to maintain the axles in proper transverse position and against longitudinal movements relative to the body of the vehicle, the axle connections being held against movements laterally of the vehicle body, that part of the composite links connected to the body being provided with a flanged arm positively guided by the slots, the body being guided in its movements by movements of said parts of said links in said slots.

4. In a motor vehicle, an underframe including axles having arcuate slots therein, a body mounted on the axles and adapted to assume an inclined banking position under the influence of lateral forces when travelling through curves on roads, and a connection between the body and separate axles including composite links pivotally connected at their outer ends to the body and axles respectively, and acting to maintain the axles in proper transverse position and against longitudinal movements relative to the body of the vehicle, the axle connections being held against movements laterally of the vehicle body, and another part of the composite links being positively guided by the slots, the connection of that part of the composite link to the body being lower than the connection between the other part of the composite link and axle, the body being guided in its movements by movements of said parts of said links in said slots.

5. In a motor vehicle, an underframe including axles having slots therein, a body mounted on the axles and adapted to assume an inclined banking position under the influence of lateral forces when travelling through curves on roads, and a connection between the body and separate axles including composite links pivotally connected at their outer ends to the body and axles respectively, and acting to maintain the axles in proper transverse position and against longitudinal movements relative to the body of the vehicle, the axle connections being held against movements laterally of the vehicle body, and another part of each composite link being positively guided by an associated seat, said slots being angularly extended at one end, the body being guided in its movements by movements of said parts of said links in said slots.

JOACHIM KOLBE.